(12) United States Patent
Becker

(10) Patent No.: US 7,666,066 B2
(45) Date of Patent: Feb. 23, 2010

(54) FEEDING SOLID PARTICLES INTO A FLUID STREAM

(75) Inventor: James R. Becker, N. Ridgeville, OH (US)

(73) Assignee: CryoGenesis, Cleveland, OH (US)

( * ) Notice: Subject to any disclaimer, the term of this patent is extended or adjusted under 35 U.S.C. 154(b) by 0 days.

(21) Appl. No.: 12/169,232

(22) Filed: Jul. 8, 2008

(65) Prior Publication Data

US 2009/0029632 A1    Jan. 29, 2009

(51) Int. Cl.
*B24B 1/00* (2006.01)
*G01F 11/10* (2006.01)

(52) U.S. Cl. ............... 451/38; 134/7; 222/345; 222/368

(58) Field of Classification Search ............ 451/38, 451/39, 60, 99, 446; 134/7, 162, 170, 345, 134/346, 348, 361, 368; 62/384, 603
See application file for complete search history.

(56) References Cited

U.S. PATENT DOCUMENTS

| | | | | | |
|---|---|---|---|---|---|
| 3,130,879 | A | * | 4/1964 | Messing | 222/368 |
| 3,556,355 | A | * | 1/1971 | Ruiz | 222/368 |
| 4,180,188 | A | * | 12/1979 | Aonuma et al. | 222/368 |
| 4,947,592 | A | * | 8/1990 | Lloyd et al. | 451/99 |
| 7,112,120 | B2 | * | 9/2006 | Rivir et al. | 451/38 |
| 2008/0261496 | A1 | * | 10/2008 | Mase et al. | 451/99 |

* cited by examiner

*Primary Examiner*—Timothy V Eley
(74) *Attorney, Agent, or Firm*—Fay Sharpe LLP

(57) ABSTRACT

A method and apparatus for injecting solid particles such as dry ice into an airstream using an airlock having a spherical valve member with spaced through ports and rotatable between an annular seal on one side of the spherical member for feeding the particles to the fluid stream chamber with an annular seal on the opposite side for sealing a particle feed chamber. The airlock device is useful for sealing fluid stream pressure of about 133 Kg/m² and temperatures of about 350° R.

21 Claims, 1 Drawing Sheet

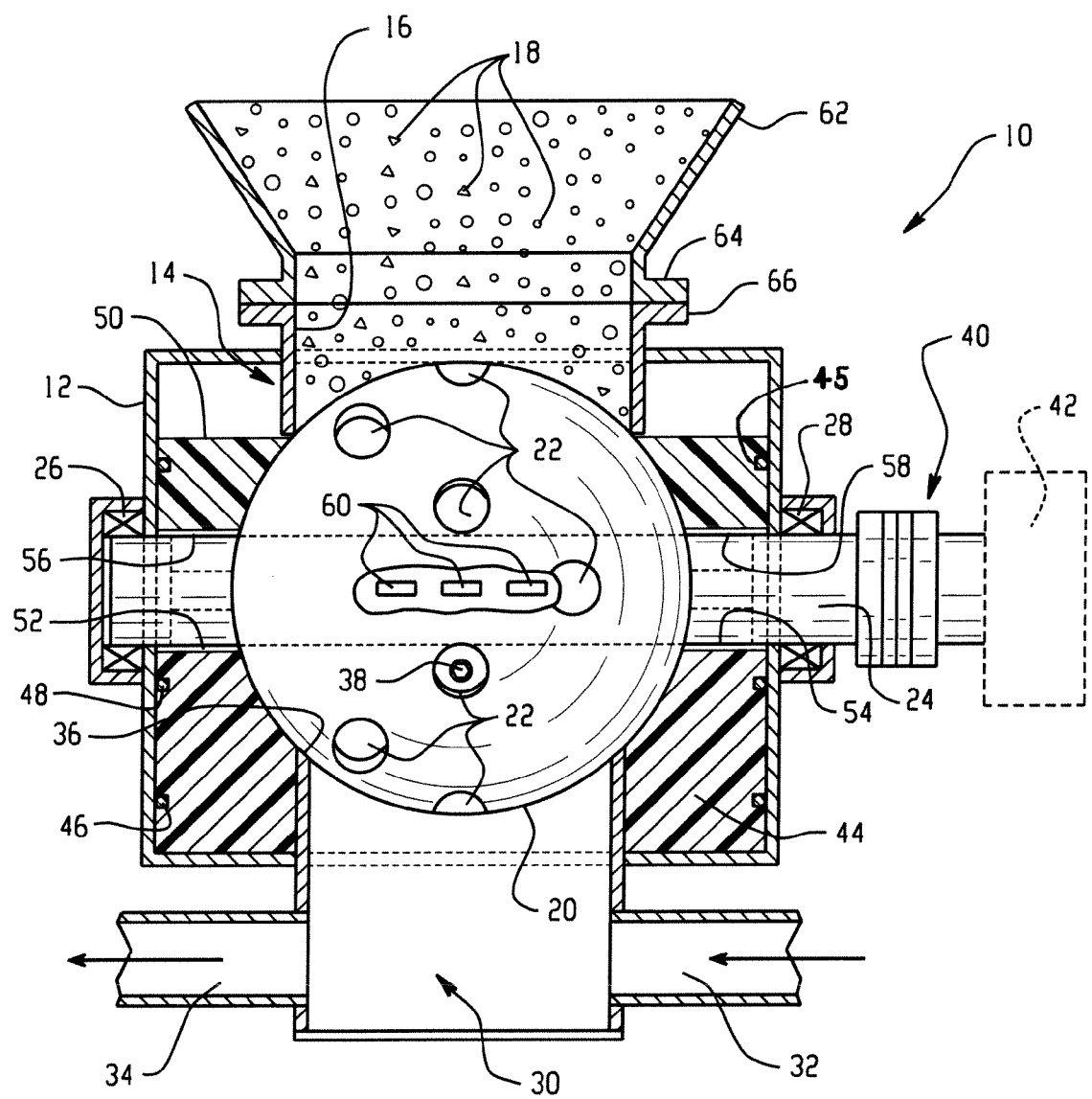

FEEDING SOLID PARTICLES INTO A FLUID STREAM

BACKGROUND

The present disclosure relates to devices for feeding solid particles into a fluid stream and particularly a pressurized stream of air such as that employed for blasting or cleaning operations where it is desired to inject solid particles for effecting abrasion on the article to be cleaned by the fluid stream. A particularly widely employed application of such devices is that of feeding solid carbon dioxide or dry ice particles into a pressurized air stream for blast cleaning of particles or items to be cleaned and recycled in a manufacturing or assembly operation. Such devices for introducing particles into a fluid stream are often referred to as "air-lock valves." Dry ice fluid blasting is widely used for cleaning metal parts to be used in manufacturing or reconditioning of components, these items can be found in the automotive, electrical, nuclear, and printing industries.

Heretofore, vane type devices have been employed for feeding dry ice particles into a pressurized air stream; and, problems have been encountered in providing sealing of the pressurized fluid from the feeding chamber for the dry ice particles and particularly as the feeder device is lowered to the temperature of the dry ice of about −110° F. (350° R). Typically, the feeder mechanism is operated by a motor to rotate the vane or disc member for introduction of the dry ice particles into the flow stream. Another type of feeder mechanism employed for feeding dry ice particles into a fluid stream is that of a cylindrical rotary member; however, feeder mechanisms of this type have also encountered problems of sealing about the injection port to the fluid pressure chamber and the cylindrical rotor member at the extremely low temperatures encountered where dry ice is fed into the fluid stream. Heretofore, where increased pressure was applied to the seals for effecting sealing to overcome the contraction of the feeder components, the increased friction required prohibitive increases in power to the motor employed for rotating the vane, disc or rotary cylinder. Thus, it has been desired to provide a feeder device for injecting particles into a fluid stream, particularly for injecting dry ice into a pressurized air stream, in which effective sealing is provided at the extremely low temperatures encountered with dry ice and in such a manner as to eliminate the need for excessive power to the motor for rotating the feeder mechanism.

BRIEF DESCRIPTION

The present disclosure describes a feeder device for injecting solid particles into a fluid stream, and particularly for injecting dry ice into a pressurized air stream, employing a spherical member having recesses therein for receiving the solid particles from a feeding inlet and having a pair of annular seals disposed on opposite sides of the spherical member which is disposed in a housing for rotation therein. The side of the spherical member opposite the particle feed inlet is disposed over a particle inlet to a fluid pressure chamber and is sealed thereabout by one of the annular seal members. The spherical member is mounted on a shaft journalled for rotation in the housing and may be motor driven for rotating the spherical member to cause the recesses to receive dry particles and rotate them past the seals to the inlet to the fluid pressure chamber. A portion of the annular seal between the spherical member and the fluid pressure chamber has the curvature thereof matched to the curvature of the spherical member for effective sealing. The spherical member and housing may be formed of stainless steel; and, it has been found satisfactory to form the first and second annular seals of polytetrafluoroethylene material filled with glass fiber particularly for service at temperatures of −110° F. The region surrounding this spherical member between the annular seals is vented to the atmosphere to relieve any residual pressure trapped in the recesses as they rotate past the seals.

The present device thus provides a spherical rotating member with recesses therein for receiving solid particles and rotating the spherical member to pass the solid particles past annular seals for discharge through an inlet into a pressurized fluid flow chamber for carrying the solid particles in the fluid stream.

BRIEF DESCRIPTION OF THE DRAWINGS

The sole drawing is a section view taken through the axis of symmetry of the feeder device of the present disclosure.

DETAILED DESCRIPTION

Referring to the drawing, the feeder device of the present disclosure is indicated generally at 10 and includes a body or housing 12 having a generally hollow cylindrical configuration and has an inlet fitting subassembly indicated generally at 14, which is disposed in the inner perimeter of housing 12 and which has an opening or inlet 16 for receiving solid particles 18 therein, which may be by gravity flow. The subassembly 14 may be retained in housing 12 by any suitable removable fastening.

Housing 12 has a spherical member 20 disposed therein which has a plurality of recesses 22 formed on the surface thereof in a circumferentially spaced arrangement. The spherical member 20 is disposed for rotation within housing 12 and has for this purpose a shaft 24 received therethrough. Shaft 24 is journalled for rotation in bearings 26, 28 provided on housing 12. In one embodiment, member 20 has a diameter of about 4.5 m (114 mm) with about 17 recesses 22 each of about 0.75 m (19 mm) diameter and similar depth.

Housing 12 has a fluid pressure chamber 30 formed in the lower end thereof which has an inlet 32 adapted for connection to a source of pressurized fluid, such as air, and an outlet 34 for discharging fluid therefrom. In the present practice, chamber 30 receives air pressurized typically to about 200 PSI (1380 kPa). However, lower measures and high measures may be encountered. Chamber 30 also has a particle receiving opening or port 36 formed therein and which is located to have the surface of spherical member 20 disposed thereover as illustrated in FIG. 2.

Spherical member 20 is secured to shaft 24 by any suitable expedient as, for example, a set screw 38 threaded through a bore in the spherical member located in one of the recesses 22.

Shaft 24 has an end thereof extending externally of the housing 12 provided with a coupling, indicated generally at 40, for connection to a motor 42 indicated in dashed outline operative for effecting rotation of shaft 24 and spherical member 20. Motor 42 may be either electrically operated or an air motor.

Spherical member 20 has disposed about the lower hemisphere thereof an annular seal ring 44 which has a portion of the inner periphery thereof configured to match the curvature of the spherical member 20 to effectively seal there against during rotation of the spherical member 20. Annular seal 44 may have suitable seals such as ring 46, disposed about the outer surface thereof for sealing against the inner surface of the housing 12. Optionally, a second seal ring 48 may be provided about annular member 44 and spaced from seal 46 for sealing about the inner cylindrical wall of housing 12.

A second annular seal 50 is disposed about the upper hemispherical surface of spherical member 20; and, the seal member 50 may have suitable annular seals, such as seal ring 45 about the periphery thereof for sealing against the inner surface of the housing 12. It will be understood that suitable generally semi cylindrical recesses 52, 54, 56, 58 are formed respectively in the annular seals 44, 50 to provide clearance for shaft 24 and to enable the annular seal 44 to positively seal on the surface of spherical member 20.

The housing 12, inlet fitting sub-assembly 14 and the surrounding housing structure forming the pressure chamber 30 may be formed of stainless steel or other suitable material resistant to corrosion from moisture in the fluid pressure chamber 30 and on the surface of the spherical member 20.

The region between the upper annular seal 50 and the lower annular seal 44 within the housing is vented by suitable ports 60 provided in the wall of the housing 12 as shown in the broken away central portion of the spherical member 20.

In the exemplary embodiment, a suitable hopper 62 with flange 64 is attached to flange 66 on inlet subassembly 14, by any suitable expedient, such as screws or bolts (not shown).

In operation, as the spherical member 20 is rotated, the solid particles such as dry ice particles (solid $CO^2$) descend through the inlet 16 and are collected in the recesses 22; and, as the spherical member 20 continues to rotate, the particles are retained in the recesses by seals 50, 44 until passing through the lower seal member 44. The particles are then discharged by gravity and or compressed fluid into the fluid pressure chamber 30. As the empty recesses 22 are rotated back up past the sealing surface of seal member 44, the small amount of compressed fluid from chamber 30 retained in the recess 22 is discharged into the space between the upper and lower seal members 50, 44 and vented through vent ports 60.

If desired, a suitable funnel 62 may be attached to the inlet fitting sub-assembly 14 to guide the solid particles into the inlet 16. In the illustrated exemplary embodiment, for handling dry ice particles in a compressed air stream of about 30 to 200 psi in chamber 30, the materials for the device must withstand temperature extremes of about –110° F. (350° R) and stainless steel has been found satisfactory for such service. The annular seal members 44, 50 may be formed of glass filled polytetrafluoroethylene material or other suitable material capable of sealing on the surface of the spherical member 20 in service temperatures of –110° F. In operation of the exemplary embodiment illustrated, for feeding of dry ice particles to the pressure chamber 30, the motor 42 may rotate the spherical member 20 at about 70 rpm.

The exemplary embodiment may be readily disassembled for seal replacement without special tools. In the exemplary embodiment illustrated, an operator may disassemble, replace parts and reassemble within about one hour, thereby minimizing down time and service cost.

The present disclosure thus describes a feeder device for injecting solid particles into a pressurized fluid stream for discharge of the particles in the stream such as, for example, for pressure blast cleaning and the application of blast cleaning with dry ice particles in air has been particularly described. The device utilizes a unique spherical member with recesses in the surface for rotating through annular seals to discharge the particles from a particle inlet to a port in the pressure chamber where the particles may fall by gravity from the recesses in the spherical member.

An exemplary embodiment has been described with reference to the drawing. Obviously, modifications and alterations will occur to others upon reading and understanding the preceding detailed description. It is intended that the exemplary embodiment be construed as including all such modifications and alterations and equivalents thereof insofar as they come within the scope of the appended claims.

The invention claimed is:

1. A method of injecting solid particles into a pressurized fluid stream comprising:
    (a) providing a housing having a pressure chamber with an inlet adapted for connection to a source of pressurized fluid, and having a discharge outlet, and a separate particle inlet;
    (b) disposing a generally spherical member in the housing for rotation with respect thereto about an axis and disposing a portion of the spherical member over the particle inlet;
    (c) forming a plurality of recesses in the surface of the spherical member and spacing the recesses circumferentially thereabout;
    (d) disposing a particle inlet in the housing on a side of the spherical member opposite the pressure chamber and communicating the particle inlet with the surface of the spherical member;
    (e) disposing a first annular seal between the surface of the spherical member and the pressure chamber particle inlet; and,
    (f) disposing a second annular seal between the surface of the spherical member and the housing particle inlet and venting the housing between the first and second annular seal.

2. The method defined in claim 1, wherein the step of disposing a spherical member includes providing a motor and effecting rotation of the spherical member.

3. The method defined in claim 1, wherein the step of disposing a first and second annular seal include forming seals of material capable of sealing air at pressures of at least 200 psi (133 $Kg/m_2$) at temperatures of about –110° F. (350° R).

4. The method defined in claim 1, wherein the step of disposing a first annular seal includes matching a portion of said seal to the curvature of said spherical member.

5. The method defined in claim 1, wherein the steps of disposing a first and second annular seal includes forming the seals of polytetrofluoroethylene (PTFE) with glass particle fill.

6. A feeder device for injecting solid particles into a pressurized fluid stream comprising:
    (a) a housing having a pressure chamber with an inlet adapted for connection to a source of pressurized fluid and a discharge outlet, the pressure chamber having a separate particle inlet;
    (b) a generally spherical member disposed in the housing for rotation with respect thereto about an axis, with a portion of the spherical member disposed over the pressure chamber particle inlet;
    (c) a plurality of recesses formed in the surface of the spherical member spaced circumferentially thereabout;
    (d) the housing having a particle inlet disposed generally on a side of the spherical member opposite from the pressure chamber and communicating with the surface of the spherical member;
    (e) a first annular seal disposed for sealing between the surface of the spherical member and the pressure chamber particle inlet; and,
    (f) a second annular seal disposed for sealing between the surface of the spherical member and the housing particle inlet, wherein said housing has a vent between said first and second seal.

7. The feeder device defined in claim 6, wherein the housing and spherical member are formed of stainless steel.

8. The feeder device defined in claim 6, wherein the first and second annular seal are formed of polytetrafluoroethylene (PTFE) with glass particle fill.

9. The feeder device defined in claim 6, further comprising a motor operatively connected for effecting the rotation of the spherical member.

10. The feeder device defined in claim 6, wherein said first annular seal includes an annular concave surface.

11. The feeder device defined in claim 10, wherein a portion of said concave surface is matched to the curvature of the spherical member for seating there against.

12. The feeder device defined in claim 6, wherein the spherical member is mounted on a shaft journalled for rotation on the housing.

13. The feeder device defined in claim 12, wherein the shaft has a motor connected thereto for effecting the rotation of the spherical member.

14. The feeder device defined in claim 6, wherein the spherical member has a diameter of about 4.5 m (114 mm).

15. The feeder device defined in claim 14, wherein the recesses in the spherical member have a transverse dimension of about 0.75 m (19 mm) and a depth of about 0.75 m (19 mm).

16. The feeder device defined in claim 6 further comprising an airlock valve having the first and second annular seals formed of material capable of sealing air at pressures of at least 200 psi and above at temperatures of about −110° F. (350° R).

17. The device defined in claim 16 wherein the valve includes a hopper for gravity feeding particles into the particle inlet.

18. The device defined in claim 16, wherein the valve is adapted for feeding solid carbon dioxide particles into the pressure chamber.

19. The feeder device defined in claim 6, further comprising a motor operable for rotating the spherical member at about 70 revolutions per minute.

20. The feeder device defined in claim 6 further comprising an air motor operative for rotating the spherical member.

21. The device defined in claim 6, wherein the operator can readily disassemble, replace parts and reassemble without special tools.

* * * * *